Patented May 31, 1932

1,861,209

UNITED STATES PATENT OFFICE

ALEX BROOKING DAVIS, OF CINCINNATI, OHIO, ASSIGNOR TO A. B. DICK COMPANY, OF CHICAGO, ILLINOIS, A CORPORATION OF ILLINOIS

ACETYLATED CARBOHYDRATE GUM AND THE PROCESS OF MAKING IT

No Drawing.    Application filed December 21, 1926.  Serial No. 156,260.

This invention relates to acetylated carbohydrate gum and to the process of compounding the same. The principal object of my invention is to provide a new type of chemical substances which may be used with advantage in compounding a stencilizable coating for stencil sheets. A further object of my invention is to provide a process for producing these new compositions of matter. Other objects of my invention will be in part obvious and in part pointed out hereinafter.

Of the numerous types of stencil sheets which have been prepared, one of the most important groups of colloidal substances which are applicable for this work are the carbohydrates and their esters. Among the carbohydrate compounds which I have found suitable for the purpose are the esters of various substances in the group commonly classed as carbohydrate gums. The organic acid esters of gum tragacanth may be mentioned to illustrate the type of substance referred to, and among these I am somewhat partial to the acetyl derivatives thereof. The empirical formula commonly given for this substance is $C_6H_{10}O_5$.

These substances possess a number of free hydroxyl groups, and therefore combine readily with fatty acids to form esters. Acetic acid is particularly applicable in this instance.

Acetyl derivatives of gum tragacanth, so far as I am aware, are totally new and not previously described in any available literature, and may be prepared as follows:

100 grams powdered gum tragacanth is suspended in 600 grams of glacial acetic acid, 40 grams acetic anhydride and 5 cc. of 95% sulphuric acid. This mixture is heated on the steam bath for one hour.

210 grams of acetic anhydride are then added and stirred in. The mass becomes very viscous.

The product is heated for ½ hour at water bath temperature and then 150 cc. of 50% acetic acid is added. After another ½ hour's heating, the ester is precipitated by pouring into water with stirring. The product is well washed and dried at 80 degrees C.

The yield of dry acetyl derivative from 100 grams of gum tragacanth is approximately 125 grams, and the material appears as an amorphous, yellowish, horn-like mass. The substance is acetylated tragacanth. The sulphuric acid acts as a catalyzer.

It is well known that in the preparation of fatty acid esters of componds of the carbohydrate series, their solubilities and properties vary materially according to the degree of esterification, and I do not restrict myself to the particular kind of tragacanth esters obtained by operating as above described, for varying proportions of acetic acid and acetic anhydride, the time of heating and other methods of treatment well known in the art of forming esters of carbohydrates, will produce tragacanth esters of varying properties, any one of which may be suitable for the purposes of this invention.

It is obvious also that the closer related products, such as acetyl derivatives of gum arabic and gum karaya, will yield fatty esters of a similar character, when subjected to treatment similar to that referred to.

From the above it will be noted that the basis of the process comprises the treatment of gum tragacanth with an acetylation agent, in that acetic acid and acetic anhydride are each an acetylation agent, a mixture of the two is an acetylation agent, and a mixture of the two plus sulphuric acid as a catalyst is an acetylation agent.

The stencils produced by this pocess, and from the new type of chemical substance disclosed above, possess good strength, are apparently little acted upon by the usual forms of duplicating inks and do not change materially upon standing for long periods.

What I claim is:—

1. The process of producing acetylated tragacanth, which includes reacting tragacanth gum with an acetylation agent containing acetic acid.

2. The process of producing acetylated tragacanth, which includes reacting tragacanth gum with an acetylation agent containing acetic anhydride.

3. The process of producing acetylated tragacanth, which includes reacting tragacanth gum with an acetylation agent containing acetic acid and acetic anhydride.

4. As a new compound, acetylated tragacanth.

5. As a new product, an acetyl ester of gum tragacanth.

6. As a new product, a fatty acid ester of gum tragacanth.

7. As a new product, an acetyl ester of carbohydrate gum.

8. As a new product, an acetylated carbohydrate gum.

This specification signed this 15th day of December, 1926.

ALEX BROOKING DAVIS.